US009301136B2

(12) United States Patent
Kim (10) Patent No.: US 9,301,136 B2
(45) Date of Patent: Mar. 29, 2016

(54) APPARATUS, METHOD, AND SOFTWARE FOR AUTHENTICATION OF MOBILE COMMUNICATION TERMINALS

(71) Applicant: Camp Mobile Corporation, Seoul (KR)

(72) Inventor: Dae Seong Kim, Seongnam-si (KR)

(73) Assignee: Camp Mobile Corporation, Seoul (KR)

( * ) Notice: Subject to any disclaimer, the term of this patent is extended or adjusted under 35 U.S.C. 154(b) by 131 days.

(21) Appl. No.: 13/795,658

(22) Filed: Mar. 12, 2013

(65) Prior Publication Data

US 2014/0018040 A1 Jan. 16, 2014

(30) Foreign Application Priority Data

Jul. 11, 2012 (KR) ........................ 10-2012-0075417

(51) Int. Cl.
*H04M 3/42* (2006.01)
*H04W 12/06* (2009.01)
*H04W 40/24* (2009.01)
*H04W 40/02* (2009.01)
*H04W 76/02* (2009.01)
*H04W 80/10* (2009.01)
*H04L 12/58* (2006.01)
*H04L 29/06* (2006.01)

(52) U.S. Cl.
CPC ............... *H04W 12/06* (2013.01); *H04L 51/04* (2013.01); *H04L 63/08* (2013.01); *H04L 63/0876* (2013.01); *H04W 40/02* (2013.01); *H04W 40/248* (2013.01); *H04W 76/02* (2013.01); *H04W 80/10* (2013.01)

(58) Field of Classification Search
CPC ....... H04L 63/08; H04L 51/04; H04L 12/581; H04L 67/306; H04L 63/0869; H04L 65/1086; H04L 67/14; H04L 67/143; H04W 76/02; H04W 40/02; H04W 40/248; H04W 4/12; H04W 80/10; H04W 12/06; H04W 60/00
USPC ........... 455/466, 410, 411, 412.1; 463/42, 29, 463/25; 709/205, 206, 204; 715/758, 701, 715/702, 753
IPC ................. H04L 63/08, 51/04, 12/581, 67/306, H04L 63/0869, 65/1086, 67/14, 67/143; H04W 76/02, 40/02, 40/248, 4/12, 80/10, 12/06, H04W 60/00, 48/16, 4/04; H04M 1/72547, H04M 2203/6009, 2207/18
See application file for complete search history.

(56) References Cited

U.S. PATENT DOCUMENTS

2003/0236834 A1* 12/2003 Gottfried ....................... 709/204
2006/0094401 A1* 5/2006 Eastlake, III ................... 455/411

(Continued)

*Primary Examiner* — Fred Casca
(74) *Attorney, Agent, or Firm* — Harness, Dickey & Pierce, P.L.C.

(57) ABSTRACT

An approach is provided for mobile communication terminal authentication. An invitation message is generated based on an invitation request received from a first mobile communication terminal, the invitation request including invitation information associated with a second mobile communication terminal. First authentication information associated with the invitation message is stored. The invitation message is transmitted to the second mobile communication terminal. An authentication request is received from the second mobile communication terminal, the invitation request including second authentication information extracted from the invitation message. The second mobile communication terminal is authenticated based on a comparison of the first authentication information and the second authentication information.

18 Claims, 4 Drawing Sheets

(56) References Cited

U.S. PATENT DOCUMENTS

| | | | |
|---|---|---|---|
| 2010/0319062 A1* | 12/2010 | Danieli et al. ................... 726/7 | |
| 2011/0010305 A1* | 1/2011 | Aleong et al. ......... G06Q 10/10 705/319 | |
| 2011/0228922 A1* | 9/2011 | Dhara et al. ............. 379/202.01 | |
| 2014/0041005 A1* | 2/2014 | He ................................... 726/7 | |
| 2014/0108030 A1* | 4/2014 | Tejeda-Monteagut G06F 19/327 705/2 | |

* cited by examiner

APPARATUS, METHOD, AND SOFTWARE FOR AUTHENTICATION OF MOBILE COMMUNICATION TERMINALS

CROSS-REFERENCE TO RELATED APPLICATION

This application claims priority from and the benefit of Korean Patent Application No. 10-2012-0075417, filed on Jul. 11, 2012, which is hereby incorporated by reference for all purposes as if fully set forth herein.

BACKGROUND

1. Field

Exemplary embodiments relate to authentication, and more particularly to authentication of mobile communication terminals.

2. Discussion

Due to the development of information communication technology, the range and number of uses for mobile communication terminals have significantly increased. Particularly, due to the spread of smart phones including network communication and information search functionalities, such as in connection with the Internet, and/or the like, the use of various service applications installed and utilized via smart phones have rapidly increased. Among services provided by these service applications, exists a number of services (hereinafter referred to as "authentication-requiring services") that request mobile communication terminal authentication (whether associated with the mobile communication terminal itself or a user of the mobile communication terminal) before permitting access to (or use of) some or all of the authentication-requiring services related to such service applications.

Figure 1:
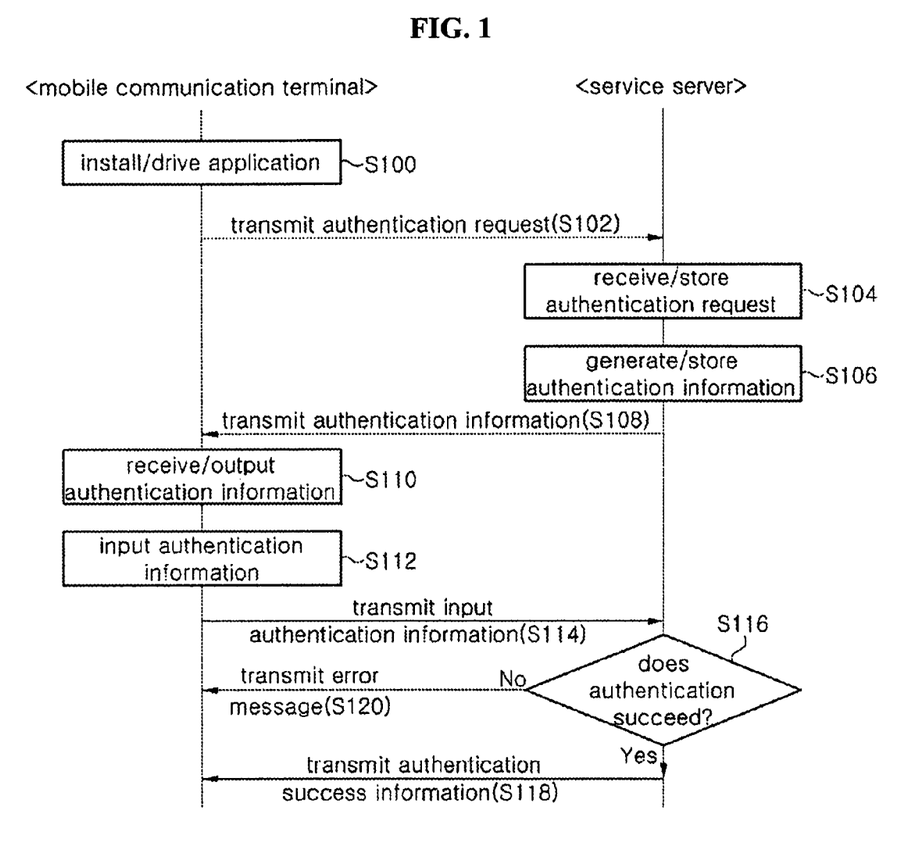
FIG. 1 is a flowchart of a conventional process to authenticate a mobile communication terminal to an authentication-requiring service.

Conventional authentication procedures are rather burdensome. For instance, FIG. 1 is a flowchart of a conventional process to authenticate a mobile communication terminal to an authentication-requiring service. Referring to FIG. 1, a user may download, install, and execute a service application providing an authentication-requiring service (e.g., a mobile messenger service) via a mobile communication terminal in order to access the features and functionality of the authentication-requiring service (S100). When the service application is executed, the service application may determine whether or not the corresponding mobile communication terminal has been authenticated with the corresponding authentication-requiring service. If the service application determines that the mobile communication terminal has not been authenticated with the corresponding authentication-requiring service, the service application transmits an authentication request to a corresponding service server configured to authenticate the mobile communication terminal with the corresponding authentication-requiring service (S102).

Accordingly, the service server will receive and may store the authentication request in a memory of or associated with the service server (S104). To this end, the service server will generate and store authentication information to enable future authentication procedures with the mobile communication terminal or a user of the mobile communication terminal (S106). For instance, the generated authentication information may be a series of text, in which numerals and characters are combined with one another in association with a password scheme, such as a one-time or limited duration password scheme. As such, the generated authentication information is transmitted from the service server to the mobile communication terminal (S108). The service application will receive the transmitted authentication information, and thereby, output the generated authentication information via, for example, a display unit associated with the mobile communication terminal (S110). In this manner, the user of the mobile communication terminal may be apprised of the authentication information utilized to access a corresponding authentication-requiring service.

When the user confirms and subsequently inputs the authentication information output via a display unit associated with the mobile communication terminal (S112), the service application will cause the mobile communication terminal to transmit the authentication information input by the user to the service server (S114). The service server will compare the received authentication information with previously stored authentication information to effectuate authentication of the mobile communication terminal (S116). It is noted that the previously stored authentication information corresponds to the authentication information generated by the service server. As a result of the comparison, the service server may determine that authentication of the mobile communication terminal fails. As such, the service server will transmit an error message to the service application of the mobile communication terminal (S120). If, however, the service server determines that authentication succeeds, the service server will transmit authentication success information to the service application of the mobile communication terminal (S118). In this manner, the user will be permitted access to the features and functions of the authentication-requiring service via the service application.

Accordingly, it is noted that various kinds of services (e.g., social networking services, mobile messaging services, gaming services, and the like) exist, in which a first user via a first mobile communication terminal may initiate communications with a second user at a second mobile communication terminal. In such instances, the second user may perform the above-noted authentication procedure in response to receiving an invitation message from the first user who has already been authenticated with the corresponding authentication-requiring service. As such, the second user will select and execute the received invitation message to install the corresponding service application, and subsequently, perform the above-noted authentication procedure. Thus, the frequency of use of the authentication-requiring service and authentication procedure is high.

It is noted that even though the second user may receive and execute the invitation message to install the corresponding service application and perform authentication of an associated mobile communication terminal, the authentication procedure of the associated mobile communication terminal will be performed again once the second user attempts to access the features and functions of the corresponding authentication-requiring service. Therefore, even after the installation of the service application and the authentication of the mobile communication terminal to install the service application, subsequent authentication to utilize the authentication-requiring service is not automatically processed. In this manner, an action related to the invitation message (e.g., authentication of the second user to initiate utilization of the authentication-requiring service between the first user and the second user) will be executed, but in response to a separate request manually performed by the second user. That is, even in instances when information capable of identifying the mobile communication terminal is stored in the associated mobile communication terminal and the service server, the authentication procedure to authenticate the associated mobile communication terminal is not automatically performed using the information. Instead, the second user must manually initiate and perform the authentication procedure with the corresponding authentication-requiring service. This can be irksome and off-putting to some users, and thereby, diminish the desirability and likelihood that such users will avail themselves to the authentication-requiring services.

Therefore, there is a need for an approach that enables convenient authentication procedures that are more efficient and less burdensome on users of mobile communication terminals.

The above information disclosed in this Background section is only for enhancement of understanding of the background of the invention and, therefore, it may contain information that does not form any part of the prior art nor what the prior art may suggest to a person of ordinary skill in the art.

SUMMARY

Exemplary embodiments provide an apparatus, method, and software configured to enable convenient authentication procedures that are more efficient and less burdensome on users of mobile communication terminals.

Exemplary embodiments provide an apparatus, method, and software for authentication of a mobile communication terminal configured to automatically perform an authentication procedure associated with the mobile communication terminal using information that identifies the mobile communication terminal when such information is stored in the mobile communication terminal and a corresponding service server.

Exemplary embodiments provide an apparatus, method, and software for authentication of a mobile communication terminal configured to, in response to receiving an invitation message, automatically process invitation information in the invitation message via a service application installed after authentication procedures have already been successfully performed to further authenticate the mobile communication terminal with an authentication-requiring service associated with the service application.

Additional aspects will be set forth in the detailed description which follows, and in part, will be apparent from the disclosure, or may be learned by practice of the invention.

According to exemplary embodiments, a method includes: generating an invitation message based on an invitation request received from a first mobile communication terminal, the invitation request including invitation information associated with a second mobile communication terminal; storing first authentication information associated with the invitation message; transmitting the invitation message to the second mobile communication terminal; receiving an authentication request from the second mobile communication terminal, the authentication request including second authentication information extracted from the invitation message; and authenticating the second mobile communication terminal based on a comparison of the first authentication information and the second authentication information.

According to exemplary embodiments, a method includes: receiving an invitation message associated with an authentication-requiring service, the invitation message including authentication information; and executing, in response to receiving the invitation message, a service application configured to enable access to the authentication-requiring service, wherein the service application is configured to: extract the authentication information from the invitation message, generate an authentication request utilizing the authentication information extracted from the invitation message, and transmit the authentication request to a service server associated with the authentication-requiring service.

According to exemplary embodiments, an apparatus includes: at least one processor; and at least one memory comprising computer code, the at least one memory and the computer code configured to, with the at least one processor, cause the apparatus at least to: generate an invitation message based on an invitation request received from a first mobile communication terminal, the invitation request including invitation information associated with a second mobile communication terminal, store first authentication information associated with the invitation message, transmit the invitation message to the second mobile communication terminal, receive an authentication request from the second mobile communication terminal, and authenticate the second mobile communication terminal based on a comparison of the first authentication information and the second authentication information.

According to exemplary embodiments, an apparatus includes: at least one processor; and at least one memory comprising computer code, the at least one memory and the computer code configured to, with the at least one processor, cause the apparatus at least to: receive an invitation message associated with an authentication-requiring service, the invitation message including authentication information, execute, in response to reception of the invitation message, a service application configured to enable access to the authentication-requiring service, wherein the service application is configured to: extract the authentication information from the invitation message, generate an authentication request utilizing the authentication information extracted from the invitation message, and transmit the authentication request to a service server associated with the authentication-requiring service.

According to exemplary embodiments, a computer readable medium is provided and configured to store at least one program, wherein the least one program includes instructions that when executed by at least one processor are configured to cause the at least one processor at least to: generate an invitation message based on an invitation request received from a first mobile communication terminal, the invitation request including invitation information associated with a second mobile communication terminal; cause, at least in part, first authentication information associated with the invitation message to be stored; cause, at least in part, the invitation message to be transmitted to the second mobile communication terminal; cause, at least in part, an authentication request to be received from the second mobile communication terminal, the authentication request including second authentication information extracted from the invitation message; and authenticate the second mobile communication terminal based on a comparison of the first authentication information and the second authentication information.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

Accordingly, various exemplary embodiments may be different, but do not have to be exclusive. For example, specific shapes, configurations, and characteristics described in association with a first exemplary embodiment may be implemented in another exemplary embodiment without departing from the spirit and the scope of the present invention. In addition, he position and arrangement of individual components may be changed without departing from the spirit and the scope of the present invention. Therefore, the detailed description of the illustrated exemplary embodiments should not be construed as restrictive.

Furthermore, in the accompanying figures, like reference numerals denote like elements. When an element is referred to as being "connected to" another element, it may be directly connected to the other element or intervening elements may be present. When, however, an element is referred to as being "directly connected to" another element, there are no intervening elements present. For the purposes of this disclosure, "at least one of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, third, etc., may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section that is discussed below may be termed a second element, component, region, layer, or section without departing from the teachings of the present invention.

Spatially relative terms, such as "beneath," "below," "lower," "above," "upper," and/or the like, may be used herein for descriptive purposes and, thereby, to describe one element or feature's relationship to another element(s) or feature(s) as illustrated in the drawings. Spatially relative terms are intended to encompass different orientations of an apparatus in use or operation in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations) and, as such, the spatially relative descriptors used herein are to be interpreted accordingly.

The terminology used herein is for the purpose of describing particular embodiments only and is not intended to be limiting. As used herein, the singular forms "a," "an," and "the" are intended to include the plural forms as well, unless the context clearly indicates otherwise. Moreover, the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

According to exemplary embodiments, a "mobile communication terminal" may include any digital device including at least one memory and at least one processor, which enable the mobile communication terminal to support data communication functions over at least one mobile communication (or wireless) network. In this manner, exemplary mobile communication terminals may include unique identification information that may be utilized to uniquely identify the mobile communication terminals on a network. For instance, exemplary mobile communication terminals may include any suitable cellular phone, radiophone, satellite phone, smart phone, wireless (or mobile) phone, computer, notebook computer, tablet computer, digital broadcast terminal, personal digital assistant, portable media player, navigational device, customized hardware, and the like. For descriptive purposes, however, exemplary embodiments are described herein in association with a "smart" phone, but exemplary embodiments are not limited thereto.

As used herein, an "authentication-requiring service" refers to a service accessible via a service application installed in a mobile communication device, in which authentication (e.g., mobile communication terminal authentication) of the mobile communication terminal or a user of the mobile communication terminal is performed to permit access to all or some of the features and functionality of the service. For instance, exemplary authentication-requiring services may include: messenger services, navigational services, game services, social network services, and the like. It is contemplated, however, that an authentication-requiring service may include any suitable service that utilizes authentication procedures to permit access to all or some of the features and functions of the service.

An "invitation message," as used herein, refers to a message including information generated in association with an authentication-requiring service that is transmitted to a non-authenticated mobile communication terminal for authentication purposes. In exemplary embodiments, invitation messages are transmitted to mobile communication terminals yet to install a service application configured to enable access to the authentication-requiring service that at least one first user invites at least one second user to join or otherwise use. In this manner, exemplary invitation messages may include content to induce use of the service, such as, for example, a uniform resource locator (URL) address corresponding to a resource at which a service user guide and the service application may be downloaded for subsequent installation. It is further noted that the invitation message may also include information corresponding to the "inviting" party, "invited" party, the authentication-requiring service being invited to use, the service application utilized to access the authentication-requiring service, and/or the like.

According to exemplary embodiments, a system is provided to enable automated authentication procedures for mobile communication terminals to authenticate such mobile communication terminals or users of the mobile communication terminals. In this manner, the automated authentication procedures may be associated with permitting access to an authentication-requiring service not previously accessed by the mobile communication terminals or users of the mobile communication terminals. For instance, when information required to authenticate a mobile communication terminal of a user that desires to use an authentication-requiring service is stored in both the mobile communication terminal and a service server providing (or otherwise making available) the authentication-requiring service, an authentication procedure of the mobile communication terminal may be automatically performed without user intervention when the "invited" user attempts to utilize (or otherwise access) the authentication-requiring service.

For example, in response to receiving an invitation message generated by the service server, a mobile communication terminal associated with a unique identifier (e.g., phone number) may be stored in the service server and a memory of the mobile communication terminal. As will become more apparent below, the invitation message may correspond to a short message (e.g., text message, multimedia message, wireless application protocol push message, etc.), and as such, the short message may be received and stored in a mailbox associated with the mobile communication terminal. The above-noted memory may be configured to store the mailbox, and thereby, the invitation message, which may be stored among one or more other invitation messages and/or one or more other forms of messages. Since authentication of the mobile communication terminal may be performed by determining whether or not the invitation message (or information thereof) stored in the service server matches the invitation message (or information thereof) stored in the memory of the mobile communication terminal, the authentication procedure of the mobile communication terminal may be automatically performed.

Figure 2:
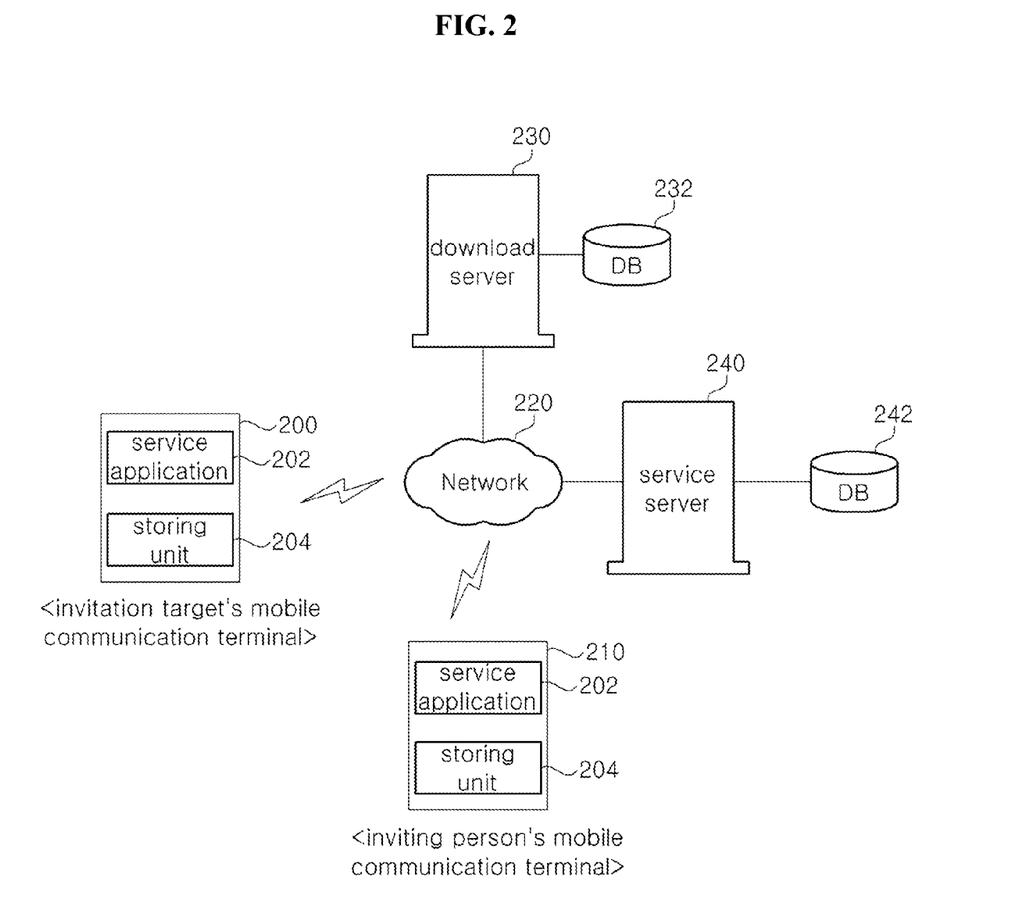
FIG. 2 is a block diagram of a system configured to enable authentication of mobile communication terminals, according to exemplary embodiments.

FIG. 2 is a block diagram of a system configured to enable authentication of mobile communication terminals, according to exemplary embodiments. As shown in FIG. 2, the system configured to authenticate mobile communication terminals may include a mobile communication terminal 200 that is to receive an invitation message from service server 240, a mobile communication terminal 210 that is to transmit an invitation request to service server 240, a network 220, a download server 230, and the service server 240. While specific reference will be made hereto, it is contemplated that the system may embody many forms and include multiple and/or alternative arrangements, components, and facilities.

According to exemplary embodiments, the network 220 may be any suitable wired and/or wireless communication medium, and may be configured in any suitable fashion, such as in the form of a personal area network (PAN), a local area network (LAN), a metropolitan area network (MAN), a wide area network (WAN), and/or the like. In this manner, network 220 may embody any one or more circuit-switched, packet-switched, and/or wireless networks configured to support data communications. As such, the illustrated system may embody a client-server environment, a master-slave environment, a peer-to-peer environment, or any other suitable networking environment.

Mobile communication terminal 210 includes a service application 202 configured to enable user access to an authentication-requiring service provided by, for example, the service server 240. The service application 202 may be installed in a memory (e.g., storing unit 204) of mobile communication terminal 210. In this manner, it is noted that mobile communication terminal 210 is assumed to have already completed an authentication procedure associated with the authentication-requiring service. As such, a user of mobile communication terminal 210 may wish to invite another user to join, subscribe, or otherwise utilize the authentication-requiring service, and therefore, mobile communication terminal 210 may be configured to transmit an invitation request to service server 240, as will become more apparent below. As such, mobile communication terminal 210 may be referred to, herein, as an originator of an invitation request, an "inviting" mobile communication terminal 210, and the like.

Mobile communication terminal 200 is configured to transmit invitation information including, for instance, unique identification information associated with the mobile communication terminal 200 and/or associated with a user of the mobile communication terminal 200. In exemplary embodiments, mobile communication terminal 200 is configured to transmit the unique identification information to the service server 240 in response to receiving an invitation message from, for instance, service server 240. As such, mobile communication terminal 200 may be referred to, herein, as a receiver of an invitation message, an "invited" mobile communication terminal 200, a "target" mobile communication terminal 200, etc.

Exemplary identification information may be one of various unique identifiers, such as, for example, a phone number, a personal identification number (PIN), a media access control (MAC) address, an internet protocol address (IP), and/or the like, that may be utilized to identify a corresponding mobile communication terminal (e.g., mobile communication terminal 200) or user of a mobile communication terminal in a mobile communication network, such as network 220. In this manner, such identification information may be utilized to transmit various information to the mobile communication terminal (e.g., mobile communication terminal 200) identified by such identification information.

According to exemplary embodiments, service server 240 may be configured to provide a plurality of authentication-requiring services or may interwork with one or more other service servers (not shown) configured to provide one or more other authentication-requiring services. As such, when mobile communication terminal 200 has already subscribed to another authentication-requiring service, first unique identification information associated with the mobile communication terminal 200 may be stored in a memory (not shown) of (or accessible to) service server 240. In this manner, service server 240 may be configured to determine, extract, retrieve, or otherwise receive second unique identification information associated with the mobile communication terminal 200 based on the first unique identification information (e.g., a nickname, moniker, etc.) associated with the other service to which the mobile communication terminal 200 has subscribed. Accordingly, the first unique identification information may be included as invitation information in an invitation request transmitted to service server 240 by mobile communication terminal 210. To this end, the first unique identification information may be identification information used in association with an interworking authentication-requiring service, such as identification information corresponding to a nickname, moniker, and/or the like, of the user to be invited to a new authentication-requiring service.

For example, service server 240 may be configured to provide a messenger service, as well as interwork with another service server (not shown) configured to provide a game service. In this manner, a mobile communication terminal 210 of a first user and a mobile communication terminal 200 of a second user may subscribe to the game service. To this end, only the mobile communication terminal 210 of the first user may subscribe to the messenger service. As such, the first user, via mobile communication terminal 210, may transmit an invitation request for the mobile communication terminal 200 of the second user to the service server 240 configured to provide the messenger service. The invitation request may include first unique identification information (e.g., a nickname, moniker, etc.) utilized by the second user in association with the game service. In response to receiving the invitation request, the service server 240 may extract the first unique identification information from the invitation request and query, for example, the other service server (not illustrated) for second unique identification information associated with the mobile communication terminal 200 of the second user utilizing the extracted identification information. The other service server may respond to the service server 240 with the second unique identification information associated with the mobile communication terminal 200, so that the service server 240 can perform an invitation procedure using the second unique identification information. For convenience and descriptive purposes, exemplary embodiments will be described, hereinafter, utilizing a phone number as the second unique identification information associated with the mobile communication terminal 200 of the second user.

It is also contemplated that the service server 240 may utilize the first unique identification information to determine, extract, retrieve, or otherwise receive the second unique identification information from a memory (not shown) of or accessible to service server 240, such as database 242.

According to exemplary embodiments, the transmitted invitation request may include invitation information configured of simple text information or service application related information that, when received by a corresponding mobile communication terminal (e.g., mobile communication terminal 200) is configured to cause a corresponding service application (e.g., service application 202) to perform one or more automated functions, such as one or more authentication procedures or procedures associated with utilization of the authentication-requiring service. Exemplary service application related information may include, for example, when mobile communication terminal 200 is being invited to a social network service, sharing request information of a specific content (e.g., specific notice), friend request information, and the like. When the mobile communication terminal 200 is being invited to a messenger service, the service application related information may correspond to chatting request information, acquaintance relationship request information, and the like. As another example, when the mobile communication terminal 200 is being invited to a game service, the service application related information may relate to battle request information, gain participation request information, cooperation game progress request information, and the like. As such, it is contemplated that any suitable service application related information may be utilized in association with any suitable authentication-requiring service.

The service server 240 may also be configured to interwork with service applications, such as service application 202 installed in the mobile communication terminal 200. In this manner, the service server 240 may provide one or more services to a user at a mobile communication terminal, e.g., mobile communication terminal 200, as well as transmit an invitation message to the mobile communication terminal 200 to enable authentication processing of the mobile communication terminal 200 in association with an authentication-requiring service that the mobile communication terminal 200 is invited to join.

In connection invitation request processing, the service server 240 may be configured to receive and store invitation information transmitted from mobile communication terminal 210 that identifies another user associated with, for instance, mobile communication terminal 200, as well as information identifying an authentication-requiring service. In addition, the service server 240 is configured to generate and store, based on the received invitation request, an invitation message configured to induce use of an authentication-requiring service based on invitation information included therein. That is, the invitation message may be generated to include a phone number (or other unique identification information) associated with the mobile communication terminal 210 or user associated with mobile communication terminal 210 (i.e., the "inviting" user), a phone number (or other unique identification information) associated with the mobile communication terminal 200 or user associated with the mobile communication terminal 200 (i.e., the "invited" user), and the like, as well as includes any other suitable information (e.g., machine code, links, addresses, instructions, etc.) configured to cause a receiving mobile communication terminal (e.g., mobile communication terminal 200) to initiate authentication procedures automatically, download an associated service application, and/or execute procedure(s) associated with utilization of the authentication-requiring service.

According to exemplary embodiments, the service server 240 may be configured to further store information corresponding to the generated invitation message, such as log information. The log information may be utilized by the service server 240 to confirm whether or not an "invited" mobile communication terminal 200 includes an invitation message in a memory of (or associated with) the "invited" mobile communication terminal 200. For instance, when the "invited" mobile communication terminal 200 transmits an authentication request to service server 240 based on execution of a received invitation message, service server 240 may be configured to determine the occurrence of such a situation based on comparing information in the authentication request with the log information. In exemplary embodiments, the information in the authentication request may correspond to at least some of the invitation message received by mobile communication terminal 200. As such, the service server 240 may be configured to determine that the invitation message is stored in a memory of (or accessible to) the mobile communication terminal 200 based on comparing the stored, generated invitation message with the at least some of the invitation message received in association with the authentication request.

Accordingly, service server 240 is configured to transmit the generated invitation message to an "invited" mobile communication terminal 200 associated with the unique identification information (for example, a phone number) included as part of invitation information received in an invitation request or determined, extracted, retrieved, or otherwise received based thereon. In exemplary embodiments, the invitation message transmitted to the "invited" mobile communication terminal 200 may include a URL address of the download server 230 configured to provide the service application (e.g., permit downloads of the service application) to be installed in order to enable a user of mobile communication terminal 200 to avail themselves of the corresponding authentication-requiring service that they are invited to join. Additionally or alternatively, the invitation message may include a URL address of a download site operated by the download server 230, identification information (e.g., phone number, or the like) of the "inviting" user of the mobile communication terminal 210 or the "inviting" person, identification information for authentication configured to automatically authenticate the mobile communication terminal 200, and the like.

In exemplary embodiments, service server 240 may interface with one or more repositories, such as database 242 to store various forms of information associated with exemplary embodiments described herein. In this manner, service server 240 may be implemented as a backend data server accessible to mobile communication devices, e.g., mobile communication device 200, via a middleware application server, e.g., a portal interface, such as made available via service application 202. It is contemplated; however, that service server 240 may be implemented in any suitable computing environment, including as a backend component, middleware component, and/or frontend component.

According to exemplary embodiments, the invitation message may be generated in a short message form and transmitted to a target mobile communication terminal 200. It is contemplated, however, that any other suitable messaging form may be utilized, e.g., multimedia message, wireless application protocol push message, etc. For descriptive purposes, exemplary embodiments are described in association with service subscription guide information being implemented as a short message of a callback URL format, the callback URL being configured to enable access to a download site via an access request after the short message is received. The identification information for authentication included in the invitation message may be information used to determine whether or not the invitation message is stored in, for example, a mailbox of storing unit 204 of mobile communication terminal 200. To this end, the identification information for authentication may be extracted from the invitation message in response to or as a part of the service application 202 being installed in mobile communication terminal 200. At least one of various forms of unique identification information, such as a phone number, or the like, of an originator (e.g., the service server 240) of the invitation message, at least a portion of information corresponding to a URL address (e.g., a short URL address) at which the service application 202 may be downloaded and installed, and identification information, such as a preset specific text syntax, or the like, may be included as part of at least some of the identification information for authentication included in the invitation message.

Further, in connection with the authentication processing, the service server 240 may be configured to automatically perform the authentication of the "invited" mobile communication terminal (e.g., mobile communication terminal 200) when, for example, the service server 240 receives an authentication request including the identification information for authentication and the phone number of the target mobile communication terminal 200. This information may be included in the invitation message transmitted from the service application 202 associated with mobile communication terminal 200, which may be transmitted to the service server 240 based on selection and/or execution of the invitation message. It is also contemplated that the above-noted information may be included in an invitation message transmitted from the service application 202 to the service server 240 based on passive performance of an authentication procedure, such as described in association with FIG. 1, wherein the authentication information is manually input by a user of mobile communication terminal 200.

Accordingly, the service server 240 may determine whether or not invitation information and an invitation message matched to the received authentication request are present (or otherwise authentic) based on the identification information for authentication and the phone number of the "invited" mobile communication terminal 200, which is included in the received authentication request. That is, the service server 240 is configured to compare the received authentication request (or information thereof) with the invitation message (or information thereof) generated based on the phone number of the "invited" mobile communication terminal 200 included in the invitation information, and thereby, determine whether the invitation message including the identification information for authentication included in the received authentication request has been transmitted to the "invited" mobile communication terminal 200, i.e., determine whether the received authentication request and the generated invitation message coincide with each other.

When, for example, it is determined that the invitation information and the invitation message matched to the authentication request are present, the service server 240 is configured to confirm that the "invited" mobile communication terminal 200 requesting authentication to access the corresponding authentication-requiring service is the "invited" mobile communication terminal 200 to which the service server 240 generated and transmitted the invitation message. As previously described, the service server 240 generated and transmitted the invitation message to the "invited" mobile communication terminal 200 based on an invitation request received from the "inviting" mobile communication terminal 210. To this end, the service server 240 is configured to perform automatic authentication of the "invited" mobile communication terminal 200.

According to exemplary embodiments, when the authentication of the "invited" mobile communication terminal 200 using the authentication request succeeds, i.e., when the invitation information and the invitation message matched to the authentication request are present, the service server 240 is configured to transmit authentication success information to the service application 202. Once the authentication success information is received, the service application 202 will be able to determine that the authentication procedure of the "invited" mobile communication terminal 200 has been automatically and successfully performed. In exemplary embodiments, the authentication success information may include the invitation information matched to the authentication request. To this end, it is noted that the included invitation information may also be configured to be used by the service application 202 after the automatic authentication is successfully completed.

While exemplary embodiments have been described in association with the service server 240 being configured to perform a function of an authentication server, it is also contemplated that the service server 240 may communicate with one or more separate authentication servers (not shown). To this end, the separate authentication server may be physically and/or logically separate from the service server 240.

The download server 230 is configured to store service applications (e.g., service application 202) that are utilized to access at least one authentication-requiring service provided by the service server 240. In exemplary embodiments, download server 230 may interface with one or more repositories, such as database 232, that are configured to store the service applications. Download server 230 may also be configured to transmit a service application (e.g., service application 202) that is requested by, for example, an "invited" mobile communication terminal 200. For instance, the mobile communication terminal 200 may be permitted to download service application 202 from database 232 via download server 230. In this manner, download server 230 may be implemented as a backend data server accessible to mobile communication devices, e.g., mobile communication device 200, via a middleware application server, e.g., a portal interface. It is contemplated; however, that download server 230 may be implemented in any suitable computing environment, including as a backend component, middleware component, and/or frontend component. Accordingly, while the service server 240 and the download server 230 are depicted as being physically and logically separated from each other, the service server 240 and the download server 230 may be physically and/or logically integrated with each other.

According to exemplary embodiments, mobile communication terminal 200 is a mobile communication terminal that is being invited to use an authentication-requiring service provided via service server 240. In this manner, mobile communication terminal 200 may not have already used the service application 202 before it is installed and the authentication procedure is performed. To this end, mobile communication terminal 200 may receive a suggestion for the use of the authentication-requiring service based on an invitation request of an "inviting" mobile communication terminal 210. In exemplary embodiments, mobile communication terminal 200 may be configured to download and install a service application 202 to gain access to the authentication-requiring service being invited to join, and thereby, may automatically be subject to authentication via service server 240 to gain access to the authentication-requiring service.

The mobile communication terminal 200 may, thereby, be configured to receive an invitation message in, for instance, a short message format, a multimedia message format, a wireless application protocol push message format, etc., from the service server 240, store the invitation message, and output the invitation message or information thereof. Further, mobile communication device 200 may be configured to access the download server 230 to download, install, and execute a service application 202 based on information received in the invitation message. Accordingly, the mobile communication terminal 200 may effectuate these features utilizing an operating system installed in the mobile communication terminal 200, and executing one or more of the processes described herein via the service application 202.

According to exemplary embodiments, the service application 202 is configured to determine, when being executed for a first time in an associated mobile communication device (e.g., mobile communication device 200), whether the associated mobile communication terminal is to be subjected to authentication to permit access to an authentication-requiring service being invited to join. When the service application 202 determines that the associated mobile communication terminal is to be subjected to authentication (i.e., determines that the associated mobile communication terminal is not already authenticated), the service application 202 may automatically initiate authentication procedures associated with the mobile communication terminal.

For instance, the service application 202 is configured to determine whether or not an invitation message including at least one of preset identification information for authentication (for example, a portion of short URL information, a phone number of an originator, and the like) is stored in a mailbox of the "invited" mobile communication terminal 200. It is noted that the service application 200 may determine the presence of the invitation message among one or more other messages, which may or may not be associated with inviting a mobile communication terminal to use an authentication-requiring service. To this end, the service application 202 is, thereby, configured to determine whether the service application 202 has been arbitrarily installed in response to selection of a user or has been installed in response to the reception and manipulation of an invitation message. Based on the above-noted determination, service application 202 is further configured to determine whether the authentication of the mobile communication terminal 200 is to be performed based on a passive authentication procedure, such as described in association with FIG. 1, or based on an automatic authentication procedure.

According to exemplary embodiments, in determining whether or not the invitation message including at least one of the preset identification information for authentication is present, various matching conditions may be determined, and thereby, set (or established). That is, the service application 202 may be configured to determine whether or not the message including at least one of the preset identification information for authentication is present regardless of when the invitation message is received and/or determine whether or not the invitation message including at least one of the preset identification information for authentication exists among messages received within a predetermined period of time (for example, 24 hours) when the invitation message is searched for by the service application 202. As such, it is contemplated that any suitable matching condition may be utilized in association with exemplary embodiments.

When it is determined that the invitation message including the identification information for authentication is present in a storage unit 204 of the mobile communication terminal 200, the service application 202 is configured to extract the identification information for authentication and the phone number of the corresponding mobile communication terminal 200 included in the stored invitation message. In this manner, the service application 202 is configured to generate an authentication request and transmit the generated authentication request to the service server 240 via, for example, network 220. When, however, it is determined that the invitation message including the identification information for authentication is not present in a storage unit 204 of the mobile communication terminal 200, the service application 202 is configured to enable conventional authentication procedures, such as described in association with FIG. 1, i.e., passive authentication procedures.

According to exemplary embodiments, when the service application 202 receives authentication success information transmitted from the service server 240 in response to transmitting an authentication request to the service server 240, the service application 202 is configured to determine that the authentication of the associated mobile communication terminal (e.g., mobile communication terminal 200) to use the authentication-requiring service has been automatically processed, and thereby, has been completed successfully.

Further, when an additional member subscription procedure (e.g., inputting of personal information associated with use of the corresponding authentication-requiring service, setting of an environment, or the like) according to one or more user selections/inputs or characteristics of the authentication-requiring service are required, the service application 202 may be configured to transmit member subscription information. Transmission of the additional member subscription information may be performed automatically based on information stored in at least one memory (e.g., storage unit 204) of mobile communication terminal 200 and/or in response to one or more inputs of a user to the mobile communication terminal 200 for transmission to the service server 240. Although exemplary embodiments are described in association with an additional procedure, such as the member subscription procedure, for using the authentication-requiring service being performed after the authentication procedure is performed, exemplary embodiments are not limited thereto. That is, a predetermined procedure, such as the member subscription procedure, or the like, may be performed prior to the authentication procedure or may be simultaneously performed in association with the authentication procedure.

According to exemplary embodiments, when only some of the services provided by the service server 240 are the authentication-requiring services, the authentication procedure may also be performed in order to permit access to the authentication-requiring service when a process of subscribing as a member to the service server 240 to receive a service that does not require the authentication is performed. In addition, for example, some or all authentication information may be included in a service subscription application program interface (API) call parameter to allow the member subscription procedure to be performed after (e.g., immediately after) the authentication is first performed via the service server 240. In this manner, the authentication procedure and the member subscription procedure may be simultaneously performed. Therefore, it is contemplated that a sequence of the authentication procedure and another additional procedure may be variously modified and altered.

As described above, the authentication success information transmitted from the service server 240 may include at least some of the invitation information transmitted from the "inviting" mobile communication terminal 210 to the service server 240. In addition, the invitation information may also include service application related information that is configured to cause a predetermined effect in association with the service application 202, e.g., cause the service application 202 to perform one or more procedures, such as automatic authentication. As such, the service application 202 may be configured to be automatically executed with respect to the invitation information after the authentication of the mobile communication terminal 200 in association with permitting access to the authentication-requiring service is completed. This may provide a predetermined result to the user of the "invited" mobile communication terminal 200. For example, when the authentication-requiring service provided by the service server 240 is the social network service, and the invitation information includes a sharing request of a specific content (e.g., specific notice), the service application 202 may be configured to automatically output (or otherwise reproduce) the specific content included in (or linked to) the received invitation information after the authentication of the "invited" mobile communication terminal 200 is completed.

Further, when the authentication-requiring service provided by the service server 240 is the messenger service and the invitation information includes the chatting request information, the service application 202 may be configured to automatically provide a chatting service between the "inviting" mobile communication terminal 210 and the "invited" mobile communication terminal 200 via the service server 240 according to the chatting request information included in the received invitation information. Again, the provisioning of the chatting service may be performed after the authentication of the "invited" mobile communication terminal 200 is completed.

When, for example, the authentication-requiring service provided by the service server 240 is the game service, and the invitation information includes the battle request information, the service application 202 may be configured to automatically provide a battle game service between the "inviting" mobile communication terminal 210 and the "invited" mobile communication terminal 200 via the service server 240 according to the battle request information included in the received invitation information. The provisioning of the battle game service may be performed after the authentication of the "invited" mobile communication terminal 200 is completed.

Figure 3A:
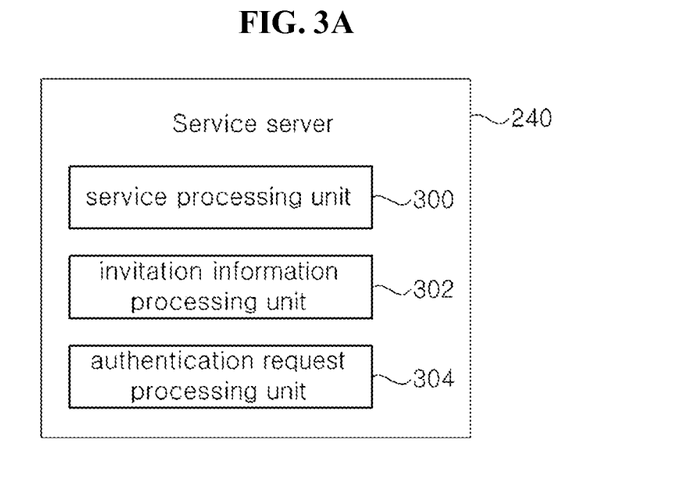
FIG. 3A is block diagram of a service server configured to enable authentication of mobile communication terminals, according to exemplary embodiments.

FIG. 3A is a block diagram of a service server configured to enable authentication of mobile communication terminals, according to exemplary embodiments. By way of example, service server 240 may be or include computing hardware, as well as one or more other components configured to execute the processes described herein. As shown in FIG. 3A, the service server 240 may be configured to include a service processing unit 300, an invitation information processing unit 302, and an authentication request processing unit 304, as well as include at least one processor (not illustrated) and at least one memory (not shown) and/or interface with at least one repository, such as database 242. It is contemplated that units (or modules) 300, 302, and/or 304 may be may be implemented via software, hardware (e.g., general processor, digital signal processing chip, an application specific integrated circuit, field programmable gate arrays, etc.), firmware, or a combination thereof. It is also contemplated that service server 240 may embody many forms and include multiple and/or alternative components. For example, it is contemplated that one or more components of service server 240 may be combined, located in separate structures, and/or separate physical locations. In other words, a specific topology is not critical to embodiments of service server 240, or the system described in association with FIG. 2.

The service processing unit 300 is configured to interwork with the service application 202 installed in a mobile communication terminal (e.g., mobile communication terminals 200 and 202) to provide an authentication-requiring service, such as a messenger service, a game service, a social network service, and the like. In this manner, service server 240 may be correspondingly configured in any suitable conventional manner to provide such services, and therefore, a detailed description of the service processing unit 300 will be omitted to avoid obscuring exemplary embodiments described herein.

The invitation information processing unit 302, according to exemplary embodiments, is configured to receive the invitation information (including the phone number of the "invited" mobile communication terminal 200) transmitted from the "inviting" mobile communication terminal 210. That is, the invitation information processing unit 302 is configured to receive the invitation information from the service application 202 installed in the "inviting" mobile communication terminal 210 based on a request input to the service application 202 by a user of the "inviting" mobile communication terminal 210. In this manner, the invitation information processing unit 302 is configured to generate an invitation message based on the received invitation information included in an invitation request, and transmit the generated invitation message to the target mobile communication terminal 200. It is also noted that the invitation information processing unit 302 is configured to store the received invitation information and the generated invitation message in a memory (not shown) of or accessible to service server 240, such as database 242. The stored invitation information and generated invitation message may be utilized in one or more subsequent processes associated with automatic authentication of the mobile communication terminal 200.

According to exemplary embodiments, the invitation message transmitted to the mobile communication terminal 200 may include the preset identification information for authentication. As described above, at least one of a phone number of an originator (e.g., phone number associated with mobile communication terminal 210), at least a portion of information on a URL address (e.g., a short URL address) of a specific server (e.g., download server 230) or site associated with a download server 230, and a preset specific text syntax may be set based on the identification information for authentication. In addition, the identification information for authentication may be configured to have a preset valid time to lose validity, such that when the preset valid time elapses after the invitation message including the identification information for authentication is issued to the "invited" mobile communication terminal 200, the identification information or authentication may expire or otherwise become invalid.

The authentication request processing unit 304 is configured to interwork with the service application 202 installed in the "invited" mobile communication terminal 200 to perform automatic authentication of the "invited" mobile communication terminal 200. More specifically, the authentication request processing unit 304 is configured to receive an authentication request transmitted from the service application 202 installed in the "invited" mobile communication terminal 200 based on an invitation message being executed. In this manner, the authentication request processing unit 304 is further configured to determine whether or not the invitation information matched to the identification information for authentication and the phone number of the "invited" mobile communication terminal 200 included in the authentication request and the invitation message generated based on the invitation information are present. Further, the authentication processing unit 304 is configured to determine whether authentication of the user of the mobile communication terminal 200 requesting the service subscription has succeeded based on whether the invitation information matched to the identification information for authentication and the phone number of the invitation target's mobile communication terminal 200 is present, thereby enabling performance of the automatic authentication procedure without intervention by the user of mobile communication terminal 200.

As described above, when a separate authentication request is not received from the service application 202, e.g., when an invitation message including identification information for authentication is not present in a memory of mobile communication device 200 (such as a mailbox associated with mobile communication terminal 200) in which the service application 202 is installed, the authentication request processing unit 304 is configured to perform passive authentication of the mobile communication terminal 200, such as described in association with FIG. 1. In exemplary embodiments, after the authentication request from the service application 202 is received, and authentication is successfully performed, the authentication request processing unit 304 may transmit authentication success information including the stored invitation information to the service application 202 to allow the service application 202 to recognize that automatic authentication performed via the service server 240 was successfully completed.

Figure 3B:
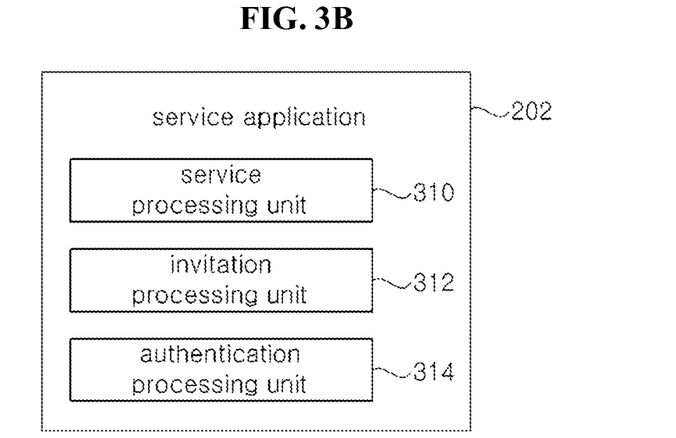
FIG. 3B is a block diagram of a service application configured to enable authentication of a mobile communication terminal, according to exemplary embodiments.

FIG. 3B is a block diagram of a service application configured to enable authentication of a mobile communication terminal, according to exemplary embodiments. As shown in FIG. 3B, the service application 202 may include a service processing unit 310, an invitation processing unit 312, and an authentication processing unit 314. It is contemplated that units (or modules) 310, 312, and/or 314 may be may be implemented via software, hardware (e.g., general processor, digital signal processing chip, an application specific integrated circuit, field programmable gate arrays, etc.), firmware, or a combination thereof. It is also contemplated that service application 202 may embody many forms and include multiple and/or alternative components.

According to exemplary embodiments, the service processing unit 310 is configured to interwork with the service server 240 to provide an authentication-requiring service, such as a messenger service, a game service, a social network service, and the like. In this manner, service processing unit 310 may be correspondingly configured in any suitable conventional manner to enable provisioning of such services, and therefore, a detailed description of the service processing unit 310 will be omitted to avoid obscuring exemplary embodiments described herein.

The invitation processing unit 312 is configured to be operated differently based on whether the associated mobile communication terminal in which the service application 202 is installed functions as the "inviting" or "invited" mobile communication terminal. When the invitation processing unit 312 functions in association with an "inviting" mobile communication terminal 210, invitation processing unit 312 is configured to generate invitation information including the phone number of the invitation target mobile communication terminal 200 in response to receiving a request from a user of the mobile communication terminal 210 to invite a user associated with the mobile communication terminal 200 to an authentication-requiring service. To this end, invitation processing unit 312 is configured to transmit the generated invitation information to the service server 240.

According to exemplary embodiments, the invitation information may be generated and transmitted to mobile communication terminal 200 in response to a user of mobile communication terminal 210 selecting a separate invitation request function provided via the service application 202 or in response to the user of the mobile communication terminal 210 selecting a function to induce interaction with another user (e.g., a user of mobile communication terminal 200) during a process of using a service provided via the service server 240. For example, when the service provided by the service server 240 is the game service, and the user of mobile communication terminal 210 specifies a specific opponent and requests the specific opponent for a battle during use of the game service, the user of mobile communication terminal 210 may input a phone number of a mobile communication terminal 200 of the opponent in order to specify an opponent that does not already subscribe to the game service. In this manner, the invitation processing unit 312 of the service application 202 may also be configured to generate the invitation information including the phone number of the mobile communication terminal 200 of the opponent input by the user of mobile communication terminal 210 and the battle request. To this end, the invitation processing unit 312 may transmit the generated invitation information to the service server 240. In a similar manner, authentication-requiring service related requests for interworking with other users of mobile communication terminals 200, such as the chatting request in the messenger service, the content sharing request in the social network service, and the like, may be used to generate the invitation information in association with these services.

Similar to the invitation processing unit 312, the authentication processing unit 314 is configured to be operated differently based on whether the associated mobile communication terminal in which the service application 202 is installed functions as the "inviting" or "invited" mobile communication terminal. When the authentication processing unit 314 functions in association with an "invited" mobile communication terminal 200, i.e., a non-authenticated mobile communication terminal 200, the authentication processing unit 314 is configured to enable either general passive authentication or automatic authentication procedure based on whether or not reception of an invitation message occurs. To avoid obscuring exemplary embodiments described herein, functions and features of authentication processing unit 314 associated with passive authentication (e.g., authentication when the user inputs authentication information) will be omitted.

In association with automatic authentication procedures, the authentication processing unit 314 is configured to determine whether the invitation message including the preset identification information for authentication is stored in a memory of mobile communication terminal 200 (e.g., a mailbox associated with mobile communication terminal 200) to determine whether or not automatic authentication is to be performed. In response to determining that the invitation message including the preset identification information for authentication is not stored in a memory of the mobile communication terminal 200, the authentication processing unit 314 is configured to perform passive authentication procedures. On the other hand, in response to determining that the invitation message including the preset identification information for authentication, such as at least a portion of a URL address of a specific server or site, or the like, is stored in a memory of the mobile communication terminal 200, the authentication processing unit 314 is further configured to determine that the installation of the service application 202 is in response to reception of the invitation message received from the service server 240. To this end, authentication processing unit 314 is configured to generate the authentication request including the phone number of the "invited" mobile communication terminal 200 and the identification information for authentication for performing automatic authentication procedures. Authentication processing unit 314 is configured to transmit the generated authentication request to the service server 240.

After the authentication processing unit 314 transmits the authentication request, authentication processing unit 314 waits for a response from the service server 240. When the authentication processing unit 314 receives authentication success information from the service server 240, the authentication processing unit 314 is configured to recognize that automatic authentication has been successfully performed via the service server 240 with respect to the "invited" mobile communication terminal 200. As such, the "invited" mobile communication terminal 200 is authenticated, and thereby, permitted to access the authentication-requiring service. When the authentication processing unit 314 receives authentication failure information from the service server 240 or does not receive authentication success information within a preset time, the authentication processing unit 314 is configured to enable passive authentication, such as described in association with FIG. 1. As described above, the authentication success information transmitted from the service server 240 may include the invitation information transmitted from the "inviting" mobile communication terminal 210 to the service server 240. In this manner, the authentication processing unit 314 may be configured to control the service processing unit 310 after successful authentication of the "invited" mobile communication terminal 200, so as to enable additional processing for the invitation information related to the service application 202, i.e., a specific operation of the service application 202 based on the invitation information.

Figure 4:
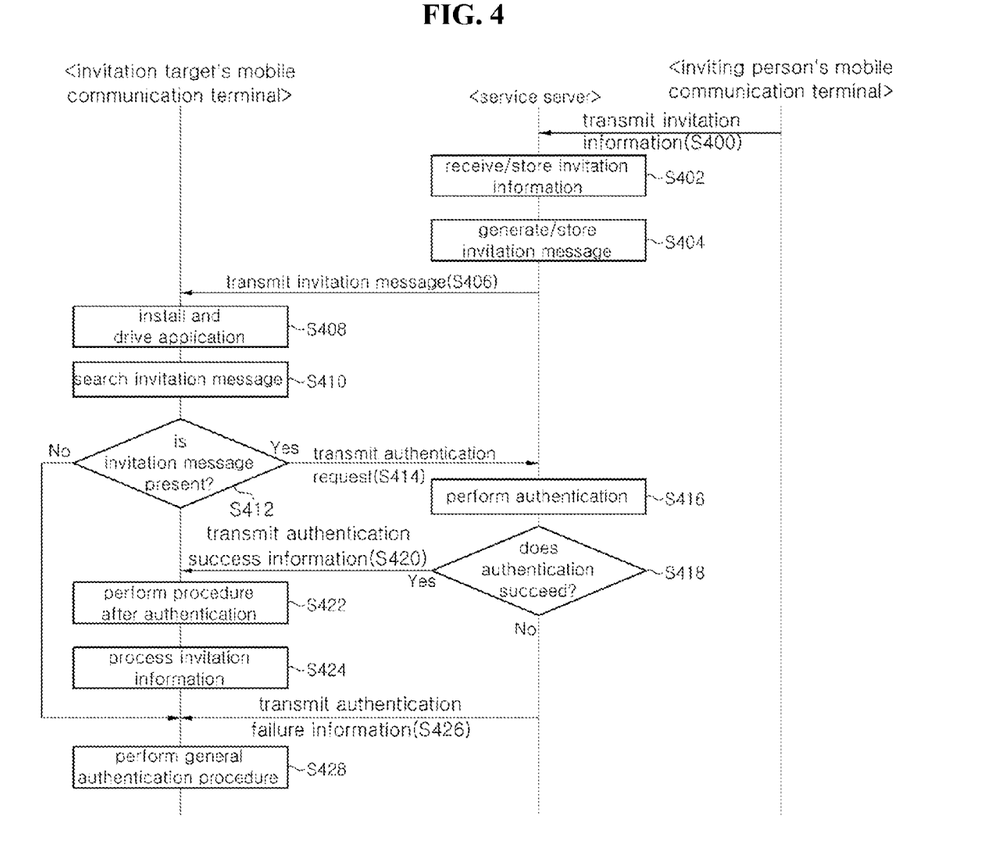
FIG. 4 is a flowchart of a process to authenticate a mobile communication terminal, according to exemplary embodiments.

FIG. 4 is a flowchart of a process to authenticate a mobile communication terminal, according to exemplary embodiments. It is noted that the steps of the process may be performed in any suitable order, as well as combined or separated in any suitable manner.

To invite a user of a mobile communication device (e.g., mobile communication device 200) to an authentication-requiring service, a user of an "inviting" mobile communication terminal 210 may be configured to transmit, for example, a phone number of the invitation target mobile communication terminal 200 and the invitation information to the service server 240, such as in the form of an invitation request (S400). As previously described, transmission of the phone number (or any other suitable identification information) may be performed in response to a request of the user of mobile communication terminal 200.

The service server 240 receives and stores the invitation information received from the "inviting" mobile communication terminal 210, including the phone number of the target mobile communication terminal 200 (S402). In this manner, service server 240 generates and stores the invitation message configured to induce a user specified by the user of mobile communication terminal 210 to subscribe to an authentication-requiring service based on the invitation information (S404). According to exemplary embodiments, the service server 240 may also store information corresponding to the generated invitation message in a memory of (or accessible to) the service server 240. For instance, the service server may store log information corresponding to whether or not a generated message was transmitted to an "invited" mobile communication terminal. As previously described, the service server 240 may utilize such log information to determine whether the invitation message is stored in a memory of (or corresponding to) the "invited" mobile communication terminal 200. Service server 240 may transmit the invitation message to the invitation target mobile communication terminal 200 based on the phone number included in the invitation request (S406) or retrieved based on other information included as part of the invitation information.

The invitation target mobile communication terminal 200 receives, stores, and outputs or otherwise executes the invitation message transmitted from the service server 240. Further, in response to the user of mobile communication terminal 200 confirming the received invitation message and selecting to install the corresponding service application 202, the "invited" mobile communication terminal 200 may access the download server 230 using the URL information included in the invitation message to download, install, and execute the service application 202 (S408).

When the service application 202 is installed in and executed by the "invited" mobile communication terminal 200, the service application 202 searches for the invitation message among messages stored in a memory (e.g., mailbox) associated with the mobile communication terminal 200 in order to perform automatic authentication of the mobile communication terminal 200 (S410). As described above, searching for the invitation message is performed in a scheme of searching the message matched to a preset search condition among the stored messages. For example, the search condition may include a point when the message is received (the message received within a preset time (for example, 24 hours) from a search point in time), whether or not the preset identification information for authentication is included, and the like. To this end, the search condition may be set as a single condition or a complex condition. For instance, when a condition for searching the invitation message is set to a message including short URL information, e.g., "me2.do" among the messages received within 24 hours, the service application 202 searches whether the message including the short URL information "me2.do" is present with respect to the messages received within 24 hours among the messages stored in, for example, the mailbox of the mobile communication terminal 200.

The service application 202 determines whether or not the invitation message matched to the search condition is present as a result of the search (S412), and performs passive authentication in response to determining that the message is not present (S428). On the other hand, in response to determining that the message matched to the search condition is present, the service application 202 extracts the phone number of the "invited" mobile communication terminal 200, extracts the identification information for authentication included in the message, generates the authentication request including the extracted phone number and identification information for authentication, and transmits the authentication request to the service server 240, in order to initiate automatic authentication procedures (S414).

The service server 240 receives the authentication request transmitted from the service application 202 and determines whether or not the information stored in steps S402 and S404 and the phone number and the identification information for authentication included in the authentication request is present to perform the automatic authentication for the "invited" mobile communication terminal 200 (S416). That is, the service server 240 determines whether the invitation message including the identification information for authentication included in the authentication request has been transmitted to the phone number included in the authentication request to perform the automatic authentication. As previously mentioned, the service server 240 may utilize the log information to enable this determination. According to whether or not the authentication succeeds (S418), the service server 240 may or may not transmit additional information to the mobile communication terminal 200. For instance, in the case in which the matched information is present, the service server 240 transmits authentication success information including the invitation information to the service application 202 (S420). In response to determining that the matched information is not present or a valid period of the identification information for authentication expires, the service server 240 transmits authentication failure information to the service application 202 (S426).

The service application 202 enables passive authentication procedures (S428) in response to receiving the authentication failure information from the service server 240. The service application 202 determines that the automatic authentication for the corresponding mobile communication terminal 200 has succeeded in response to receiving authentication success information from service server 240, and thereby, determines that the authentication procedure has successfully completed (S422).

According to exemplary embodiments, the service application 202 may also perform, after successful authentication of the mobile communication terminal 200 is complete, additional processing for the invitation information related to the service application 202 included in the authentication success information, that is, a specific operation of the service application 202 based on the invitation information (S424). As described above, the processing of the invitation information may be various authentication-requiring service related actions such as sharing of content, friend relationship settings, chatting execution, acquaintance relationship settings, battle game progress, cooperation game progress, and the like.

According to exemplary embodiments, the features, functions, and/or processes described herein may be recorded in computer-readable media including program instructions to implement various operations embodied by a computer. The computer readable media may also include, alone or in combination with program instructions, data files, data structure, and the like. The media and program instructions may be those specifically designed and constructed for the purposes of the exemplary embodiments described herein, or they may be of the kind well-known and available to those having skill in the computer software arts. Examples of the computer-readable media may include a magnetic media, such as hard disks, floppy disks, and a magnetic tape; an optical recording media (such as CD-ROM disks, DVD disks, etc.); a magneto-optical media (such as floptical disks); and hardware devices specially configured to store and perform program instructions, such as read-only memory (ROM), random-access memory (RAM), flash memory, and/or the like. Examples of program instructions may include both machine language code, such as produced by a compiler, as well as high-level language codes that may be executed by a computer using an interpreter, and/or the like. The described hardware devices may be configured to act as one more software modules in order to perform the operations of the above-described exemplary embodiments.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:
1. A method, comprising:
generating, using at least one processor, an invitation message to an authentication-requiring service based on an invitation request received from a first mobile communication terminal, the first mobile communication terminal associated with the authentication-requiring service, the invitation request including invitation information associated with a second mobile communication terminal, the second mobile communication terminal not previously associated with the authentication-requiring service;
storing, using the at least one processor, first authentication information associated with the invitation message;
extracting, from the invitation request for the authentication-requiring service, using the at least one processor, first unique identification information associated with the second mobile communication terminal;
determining, using the at least one processor, utilizing the first unique identification information, second unique identification information associated with the second mobile communication terminal from a second authentication-requiring service;
the generating including, utilizing the second unique identification to generate the invitation message;
transmitting, using the at least one processor, the invitation message to the second mobile communication terminal;

receiving, using the at least one processor, an authentication request from the second mobile communication terminal, the authentication request including second authentication information extracted from the invitation message;

automatically authenticating, using the at least one processor, the second mobile communication terminal based on a comparison of the first authentication information and the second authentication information; and automatically providing, using the at least one processor, to the second mobile communication terminal an additional service provided by the authentication-requiring service upon successful authentication of the second mobile communication terminal, the additional service included in the invitation message.

2. The method of claim 1, wherein the authentication request further comprises unique identification information corresponding to the second mobile communication terminal.

3. The method of claim 2, wherein the invitation information comprises the unique identification information, the unique identification information comprising at least one of a phone number, a media access control (MAC) address, and a personal identification number (PIN).

4. The method of claim 3, wherein the invitation message comprises at least one of a uniform resource locator (URL) address corresponding to a service application and unique identification information associated with the first mobile communication terminal.

5. The method of claim 4, wherein the first authentication information is valid for a desired period of time.

6. A method, comprising:
receiving, using at least one processor, a generated invitation message associated with an authentication-requiring service based on an invitation request received from a first mobile communication terminal, the first mobile communication terminal associated with the authentication-requiring service, the invitation request including invitation information associated with a second mobile communication terminal, the second mobile communication terminal not previously associated with the authentication-requiring service, the invitation message comprising authentication information;

executing, using the at least one processor, in response to receiving the invitation message, a service application configured to facilitate access to the authentication-requiring service, wherein the service application when executed causes the at least one processor to
  extract the authentication information from the invitation message, the extraction including extracting first unique identification information associated with the second mobile communication terminal,
  determine, utilizing the first unique identification information, second unique identification information associated with the second mobile communication terminal from a second authentication-requiring service,
  generate an authentication request utilizing the authentication information extracted from the invitation message and the second unique identification,
  cause, at least in part, the authentication request to be transmitted to a service server associated with the authentication-requiring service; and
receiving an additional service provided by the authentication-requiring service via the service server upon successful authentication of the second mobile communication terminal, the additional service included in the invitation message.

7. The method of claim 6, wherein the invitation message is received in a mailbox and the service application is further configured to:
search for the invitation message in the mailbox.

8. The method of claim 6, wherein the authentication request comprises the authentication information extracted from the invitation message and unique identification information associated with a recipient of the invitation message.

9. The method of claim 8, wherein and the unique identification information corresponds to at least one of a phone number, a machine access control (MAC) address, and a personal identification number (PIN).

10. The method of claim 6, wherein the invitation message comprises a uniform resource locator (URL) address, the method further comprising:
retrieving the service application utilizing the URL address.

11. The method of claim 10, wherein the authentication information is valid for a desired time and the service application is further configured to:
determine that the authentication information extracted from the invitation message is valid before generation of the authentication request.

12. A non-transitory computer readable medium configured to store at least one program, wherein the least one program comprises instructions that when executed by at least one processor are configured to cause the at least one processor at least to:
generate an invitation message to an authentication-requiring service based on an invitation request received from a first mobile communication terminal, the first mobile communication terminal associated with the authentication-requiring service, the invitation request including invitation information associated with a second mobile communication terminal, the second mobile communication terminal not previously associated with the authentication-requiring service;
cause, at least in part, first authentication information associated with the invitation message to be stored;
cause, at least in part, extraction from the invitation request for the authentication-requiring service, first unique identification information associated with the second mobile communication terminal;
cause, at least in part, determination utilizing the first unique identification information, second unique identification information associated with the second mobile communication terminal from a second authentication-requiring service;
cause, at least in part, utilization of the second unique identification to generate the invitation message;
cause, at least in part, the invitation message to be transmitted to the second mobile communication terminal;
cause, at least in part, an authentication request to be received from the second mobile communication terminal, the authentication request including second authentication information extracted from the invitation message;
cause, at least in part, automatic authentication of the second mobile communication terminal based on a comparison of the first authentication information and the second authentication information; and
cause, at least in part, automatic provision to the second mobile communication terminal an additional service provided by the authentication-requiring service upon successful authentication of the second mobile communication terminal, the additional service included in the invitation message.

13. An apparatus, comprising:
at least one processor; and
at least one memory including computer code, which when executed by the at least one processor, configures the processor to,
generate an invitation message to an authentication-requiring service based on an invitation request received from a first mobile communication terminal, the first mobile communication terminal associated with the authentication-requiring service, the invitation request including invitation information associated with a second mobile communication terminal, the second mobile communication terminal not previously associated with the authentication-requiring service;
store first authentication information associated with the invitation message;
transmit the invitation message to the second mobile communication terminal;
receive an authentication request from the second mobile communication terminal, the authentication request including second authentication information extracted from the invitation message;
extract, from the invitation request for the authentication-requiring service, first unique identification information associated with the second mobile communication terminal;
determine, utilizing the first unique identification information, second unique identification information associated with the second mobile communication terminal from a second authentication-requiring service; and
utilize the second unique identification to generate the invitation message;
automatically authenticate the second mobile communication terminal based on a comparison of the first authentication information and the second authentication information; and
automatically provide to the second mobile communication terminal an additional service provided by the authentication-requiring service upon successful authentication of the second mobile communication terminal, the additional service included in the invitation message.

14. The apparatus of claim 13, wherein the authentication request further comprises unique identification information corresponding to the second mobile communication terminal.

15. The apparatus of claim 14, wherein the invitation information comprises the unique identification information, the unique identification information comprising at least one of a phone number, a machine access control (MAC) address, and a personal identification 4 number (PIN).

16. The apparatus of claim 15, wherein the invitation message comprises at least one of a uniform resource locator (URL) address corresponding to a service application and unique identification information associated with the first mobile communication terminal.

17. The apparatus of claim 16, wherein the first authentication information is valid for a desired period of time.

18. An apparatus, comprising:
at least one processor; and
at least one memory comprising computer code, which when executed by the at least one processor, configures the processor to,
receive a generated invitation message associated with an authentication-requiring service based on an invitation request received from a first mobile communication terminal, the first mobile communication terminal associated with the authentication-requiring service, the invitation request including invitation information associated with a second mobile communication terminal, the second mobile communication terminal not previously associated with the authentication-requiring service, the invitation message comprising authentication information,
execute, in response to reception of the invitation message, a service application configured to enable access to the authentication-requiring service,
wherein the service application when executed causes the at least one processor to,
extract the authentication information from the invitation message, the extraction including extracting first unique identification information associated with the second mobile communication terminal,
determine, utilizing the first unique identification information, second unique identification information associated with the second mobile communication terminal from a second authentication-requiring service,
generate an authentication request utilizing the authentication information extracted from the invitation message and the second unique identification,
cause, at least in part, the authentication request to be transmitted to a service server associated with the authentication-requiring service; and
receive an additional service provided by the authentication-requiring service via the service server upon successful authentication of the second mobile communication terminal, the additional service included in the invitation message.

* * * * *